United States Patent [19]
Koisuka et al.

[11] Patent Number: 5,174,490
[45] Date of Patent: Dec. 29, 1992

[54] BRAZING METHOD

[75] Inventors: Mikio Koisuka, Gunma; Naoyoshi Sutoh, Takasaki; Hisao Aoki, Maebashi, all of Japan

[73] Assignee: Sanden Corporation, Gunma, Japan

[21] Appl. No.: 736,623

[22] Filed: Jul. 26, 1991

[30] Foreign Application Priority Data

Jul. 26, 1990 [JP] Japan .................. 2-198751

[51] Int. Cl.⁵ ............... B23K 1/20; B23K 101/14
[52] U.S. Cl. ................... 228/183; 228/223; 427/470
[58] Field of Search ........... 228/183, 223, 176, 207, 228/263.17; 427/27, 424, 328, 427

[56] References Cited

U.S. PATENT DOCUMENTS

| | | | |
|---|---|---|---|
| 2,569,097 | 9/1951 | Grange | 427/311 |
| 3,310,868 | 3/1967 | LaPorte | 29/890.046 |
| 3,440,712 | 4/1969 | Stroup | 228/221 |
| 3,489,448 | 1/1970 | Nagara | 29/890.047 |
| 3,857,164 | 12/1974 | Chartet | 228/165 |
| 3,893,611 | 7/1975 | Chartet | 228/213 X |
| 4,214,925 | 7/1980 | Arita | 148/127 |
| 4,501,387 | 2/1985 | Hoyer | 228/183 |
| 4,571,352 | 2/1986 | Aoki | 427/431 |
| 4,732,311 | 3/1988 | Hasegawa | 228/138 |
| 4,774,106 | 9/1988 | Kozono | 228/223 X |
| 4,781,320 | 11/1988 | Fujiyoshi | 228/183 |
| 4,831,701 | 5/1989 | Yutaka | 29/890.054 |
| 4,901,907 | 2/1990 | Enokido et al. | 228/183 |
| 4,901,908 | 2/1990 | Negura et al. | 228/183 |
| 4,989,775 | 2/1991 | Shimajiri et al. | 228/183 X |

FOREIGN PATENT DOCUMENTS

| | | | |
|---|---|---|---|
| 0128269 | 7/1983 | Japan | 228/183 |
| 1192467 | 8/1989 | Japan | 228/183 |

Primary Examiner—Samuel M. Heinrich
Attorney, Agent, or Firm—Baker & Botts, L.L.P.

[57] ABSTRACT

A method of brazing a temporarily assembled heat exchanger includes the steps of spraying an ionized fluid such as water on one surface. A powdered electrostatically charged flux is blown onto the opposite surface of the heat exchanger. A portion of the powdered flux is attracted to the one surface by the ionized fluid. Therefore, the flux material is uniformly spread across the heat exchanger. Finally, the heat exchanger is heated and brazed.

19 Claims, 6 Drawing Sheets

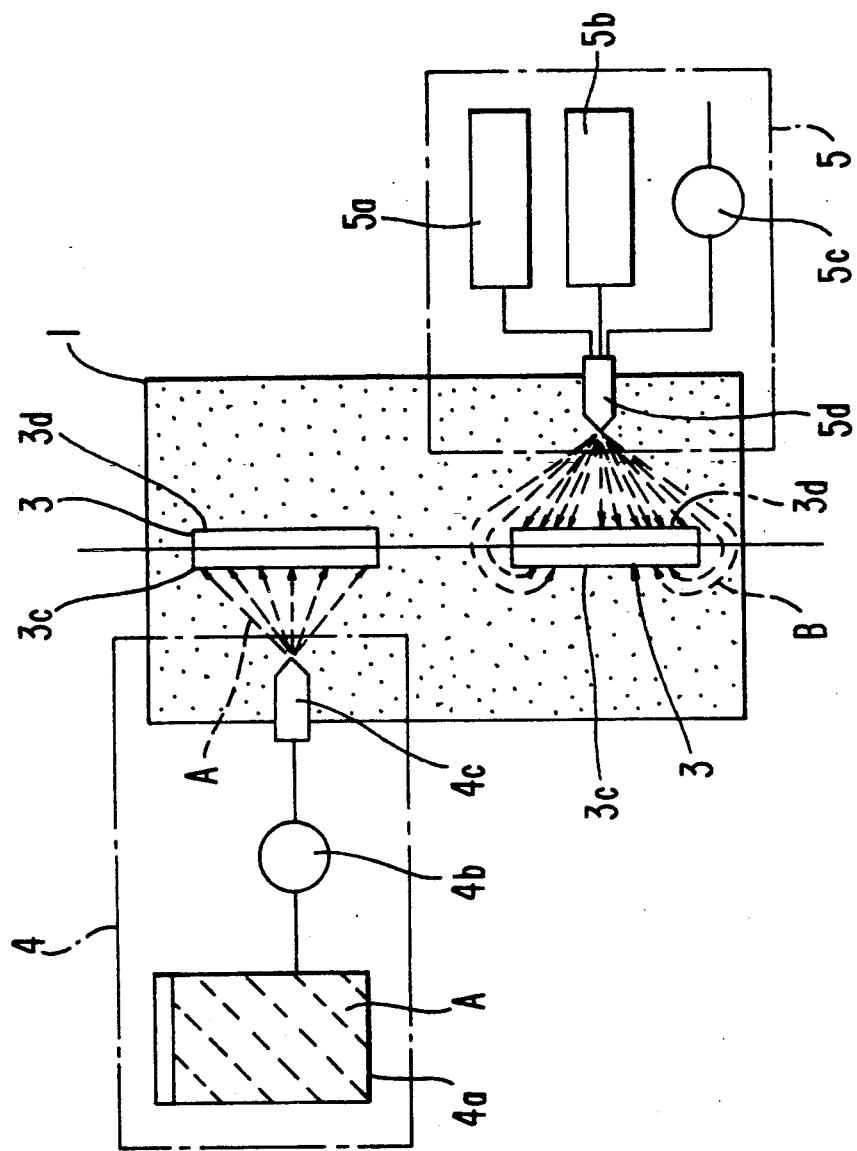

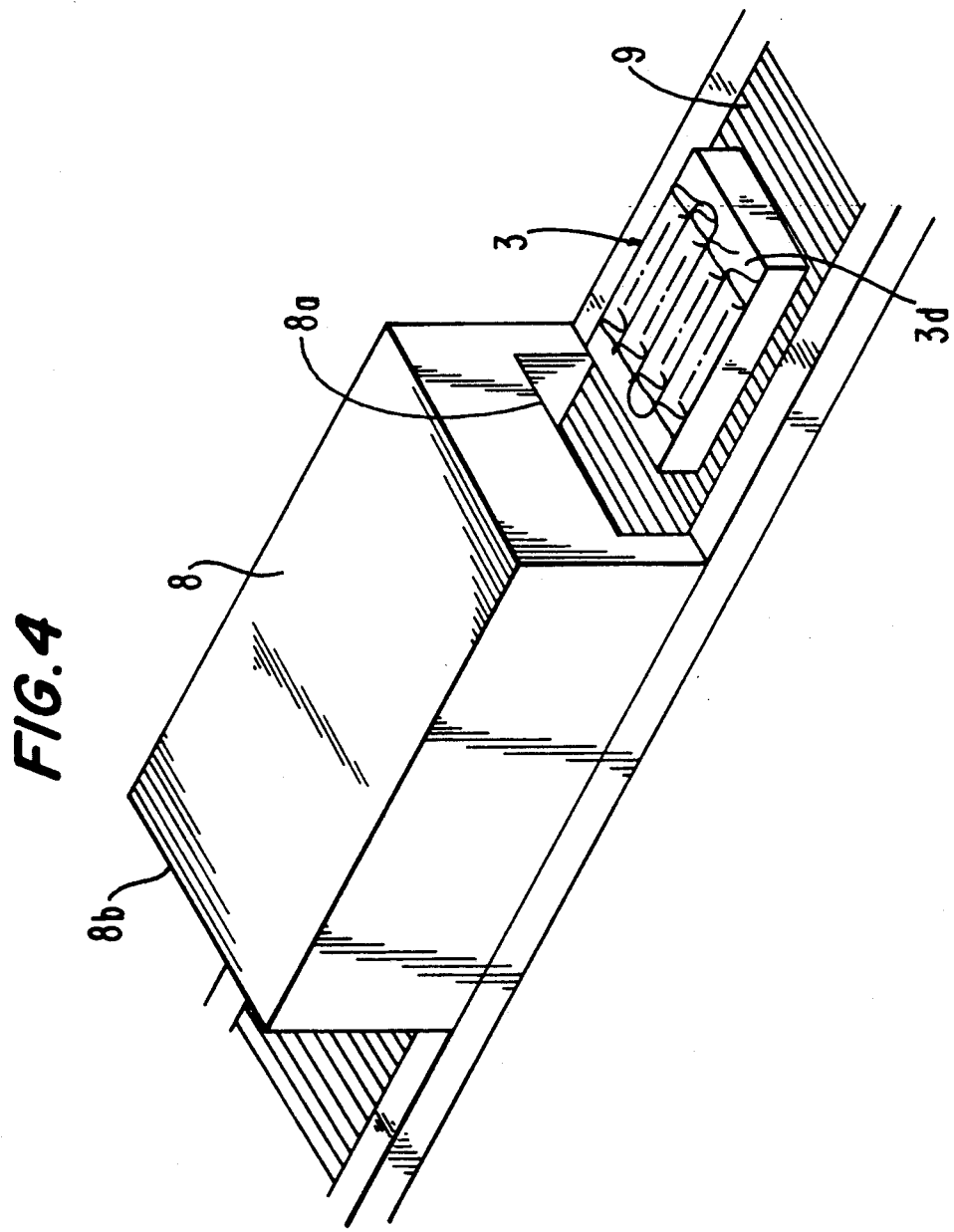

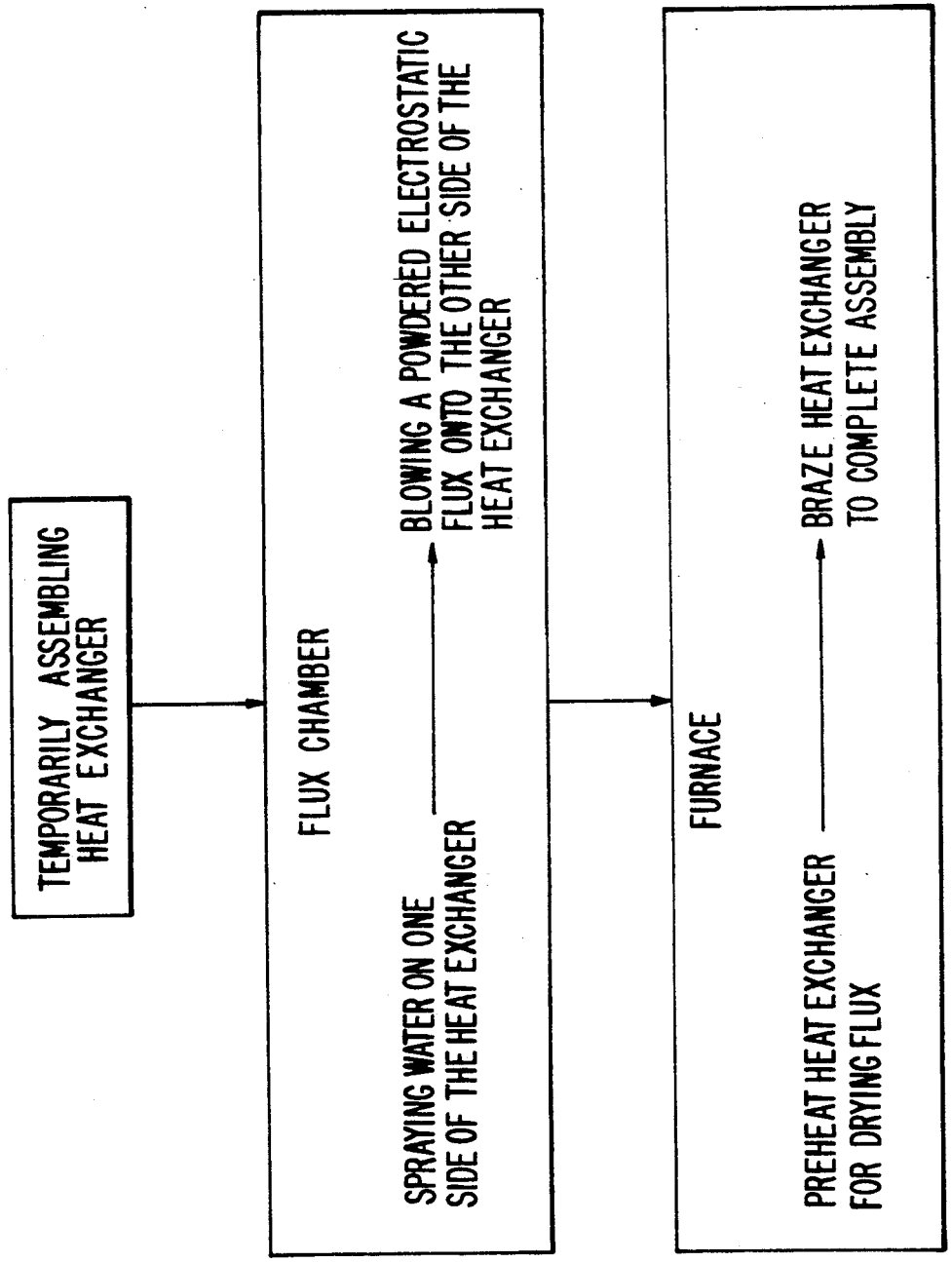

BRAZING METHOD

CROSS-REFERENCE TO RELATED APPLICATION

Applicants have filed this same day, a commonly assigned application, Ser. No. 07/736,629 entitled "Brazing Method." The disclosure of this application is hereby incorporated by reference in its entirety.

TECHNICAL FIELD

The present invention relates to a brazing method, and more particularly, to a method of coating an object with a flux.

BACKGROUND OF THE INVENTION

Heat exchangers including a serpentine flat tube and corrugated fins disposed between parallel sections of the tube used in an air conditioning system are well known. In brazing the serpentine tube and corrugated fins, various methods for coating flux have been employed. For example, a slurry of flux may be sprayed onto the heat exchanger, or the heat exchanger can be dipped into a flux bath, or electrostatic powdered flux may be blown onto the heat exchanger. The electrostatic powder is a dry powder, thus water is not used in blowing or coating the heat exchanger. It is not necessary to use a drying process when blowing an electrostatic powdered flux. On the other hand, it is necessary to use a drying process when spraying a slurried flux or when the heat exchanger is dipped in a flux bath. The coat of flux is relatively even, but despite cost savings over manually applying the flux, these methods suffer from disadvantages.

The brazing method using the above method of blowing a powdered electrostatic flux is explained as follows. A heat exchanger is temporarily assembled by disposing corrugated fins between the parallel flat outer surfaces of a serpentine flat tube which is fixed in position by a jig. The temporarily assembled heat exchanger is charged with electricity in reverse polarity to the flux. The powdered electrostatic flux is then blown onto one side surface of the heat exchanger. The powdered electrostatic flux attaches to the sides of the heat exchanger by an attractive electrical force. Thereafter, the heat exchanger is heated in a furnace, which completes the brazing process.

However, since the flux coats or attaches to the surface of the heat exchanger by only an attractive electrical force, this gives rise to a poorly coated heat exchanger. In addition, since the flux is blown onto only one side of the heat exchanger, the amount of flux which attaches to the other side of the heat exchanger is considerably less. Thus, a lack of uniformity in attaching the flux exists.

Alternatively, and as a means for solving the above problems, it has been suggested that two machines be employed for blowing the flux on both sides of the heat exchanger. If two machines are used in this way, then the cost of the fluxing method significantly increases. Also, the amount of flux that attaches to the heat exchanger does not increase as the amount of flux being blown onto the heat exchanger increases. However, some of the excess flux will be carried into the furnace. The excess flux is waste which causes the interior of the furnace to be fouled.

SUMMARY OF THE INVENTION

It is a primary object of the present invention to provide a brazing method which may improve the efficiency of attaching flux to an article.

It is another object of the present invention to provide a brazing method which may produce an article at low cost.

A brazing method according to the present invention comprises the steps of spraying water onto a surface of a temporarily assembled article, blowing a powdered electrostatic flux toward one surface of the article and heating the article in a furnace for brazing thereof.

Further objects, features and other aspects of the present invention will be understood from the following detailed description of the preferred embodiment of the present invention with reference to the annexed drawings.

BRIEF DESCRIPTION OF THE DRAWINGS

FIG. 3 is a schematic view illustrating machines for spraying water and blowing a powdered electrostatic flux.

FIG. 4 is a schematic perspective view illustrating a heating process.

FIG. 6 is a flow diagram showing the steps in the brazing process.

DETAILED DESCRIPTION OF THE PREFERRED EMBODIMENT

Figure 1:
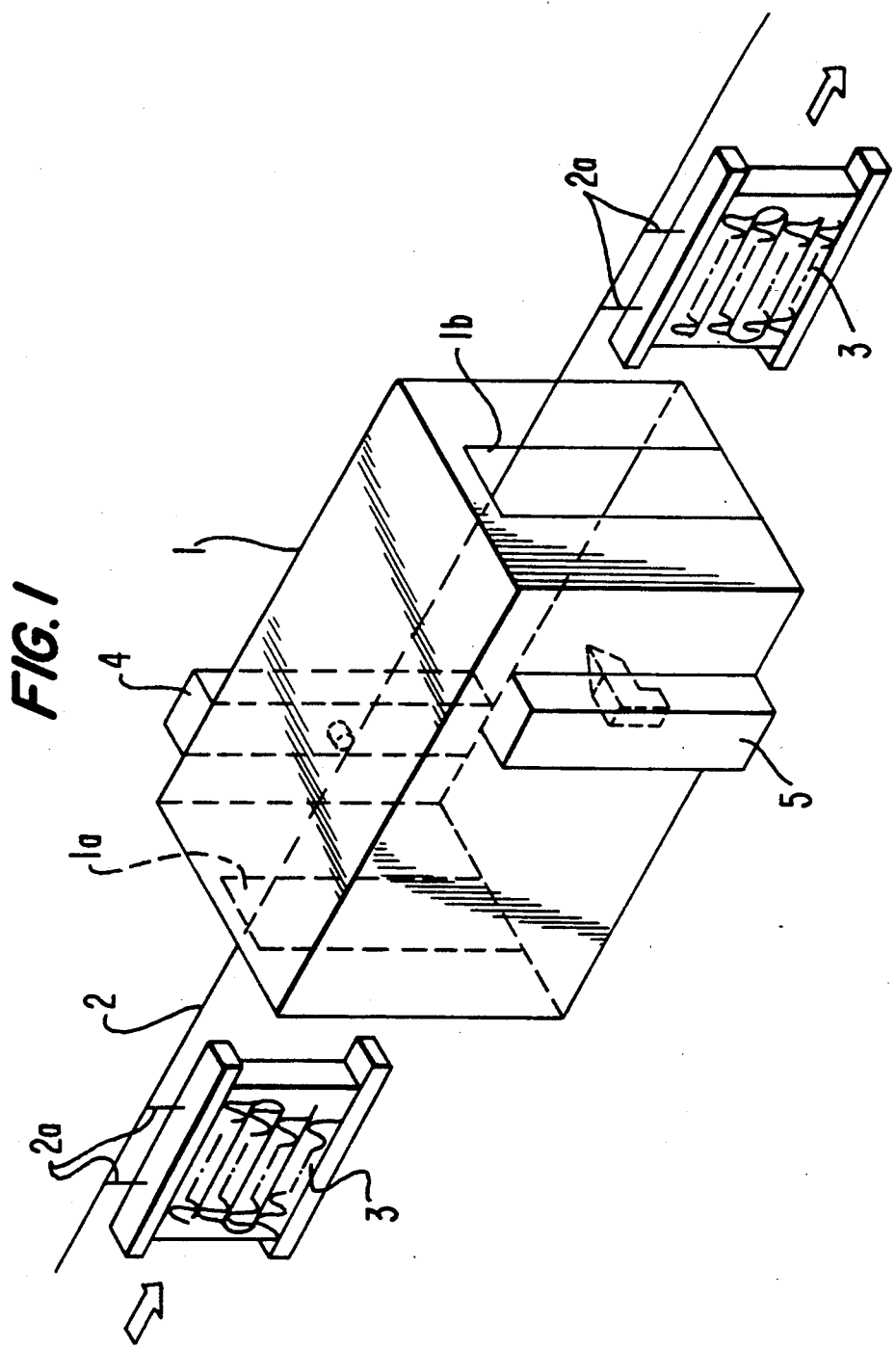
FIG. 1 is a schematic perspective view illustrating the steps of spraying water and blowing powdered electrostatic flux.

Referring to FIGS. 1-4 and 5(b), a brazing method according to one embodiment of the invention is shown. With reference to FIG. 1, a process of spreading or spraying water or some other ionized fluid and blowing, or expelling, a powdered electrostatic flux onto a heat exchanger is shown schematically.

Flux chamber 1 includes inlet opening 1a and outlet opening 1b. Overhead conveyor 2 extends through both openings 1a and 1b. Heat exchanger 3 is hung on overhead conveyor 2 by wires 2a. Water spraying machine 4 is disposed adjacent inlet opening 1a on one side of flux chamber 1. Electrostatic coating machine 5 is disposed adjacent outlet opening 1b on the other side of flux chamber 1. Thus, water spraying machine 4 will face one side surface of heat exchanger 3, while electrostatic coating machine 5 faces the other side surface.

Figure 2:
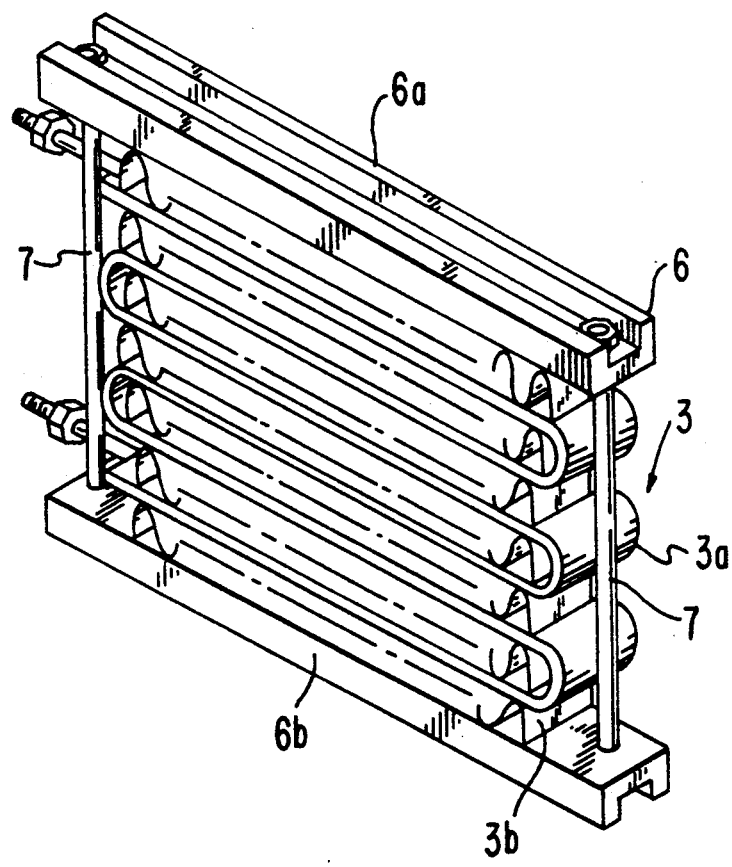
FIG. 2 is a perspective view of a temporarily assembled heat exchanger.

With reference to FIG. 2, a temporarily assembled heat exchanger held together by a jig is shown. Heat exchanger 3 is made of aluminum and includes serpentine tube 3a and corrugated fins 3b disposed between the flat parallel surface portions or tube sections of serpentine tube 3a. Heat exchanger 3 is sandwiched between upper the jig members 6a and 6b and tightly secured by long nut and bolt mechanisms 7. Other means for securing the jig members will be readily recognized by those skilled in the art.

With reference to FIG. 3, the schematic construction of a water spraying machine 4 and an electrostatic coating machine 5 are illustrated. Water spraying machine 4 includes reservoir tank 4a, pump 4b and nozzle 4c. Water A contained in reservoir tank 4a is sprayed on one side surface 3c of heat exchanger 3 through nozzle 4c by pump 4b. Electrostatic coating machine 5 includes a supply of powdered flux within container 5a, high voltage generating device 5b, compressor 5c and gun 5d for blowing powdered electrostatic flux B. Powdered flux B is supplied to gun 5d from flux container 5a and is positive or negative charged with electricity by high voltage generating device 5b. Powdered and electrically charged flux B is blown toward the other side 3d of heat exchanger 3 by compressed air from compressor 5.

With reference to FIG. 4, a drying process and a brazing process are shown. Furnace 8 includes a preheat portion and a brazing portion. The preheat portion is adjacent inlet opening 8a and the brazing portion is adjacent outlet opening 8b. Heat exchanger 3 is dried in the preheat portion of furnace 8. After passing through the preheat portion of the furnace, heat exchanger 3 is conveyed into the brazing furnace. In the brazing portion, the assembly of the heat exchanger is completed.

The method of coating heat exchanger 3 with a flux and brazing heat exchanger 3 is described as follows and with reference to FIG. 6. Flat tube 3a and corrugated fins 3b which form heat exchanger 3 are temporarily assembled with jig 6 and nut and bolt mechanisms 7. Once temporarily assembled, heat exchanger 3 is hung on overhead conveyor 2 by wires 2a. Heat exchanger 3 is then charged with electricity such that the polarity is reversed to the polarity of flux B. Heat exchanger 3 is the conveyed into flux chamber 1 through inlet opening 1a.

Water is sprayed on one side surface. 3c of heat exchanger 3 by water spraying machine 4 in chamber The water clings to the surface of heat exchanger 3. Thereafter, heat exchanger 3 is moved in front of electrostatic coating machine 5 and flux B charged with electricity is blown toward the other side surface 3d of heat exchanger 3 by electrostatic coating machine 5. Since the water is attached or clings to side surface 3c, a portion of flux B blown toward surface 3d side is attracted to side surface 3c by the attractive electrostatic force as well as the attractive force of the water.

Figure 5A:
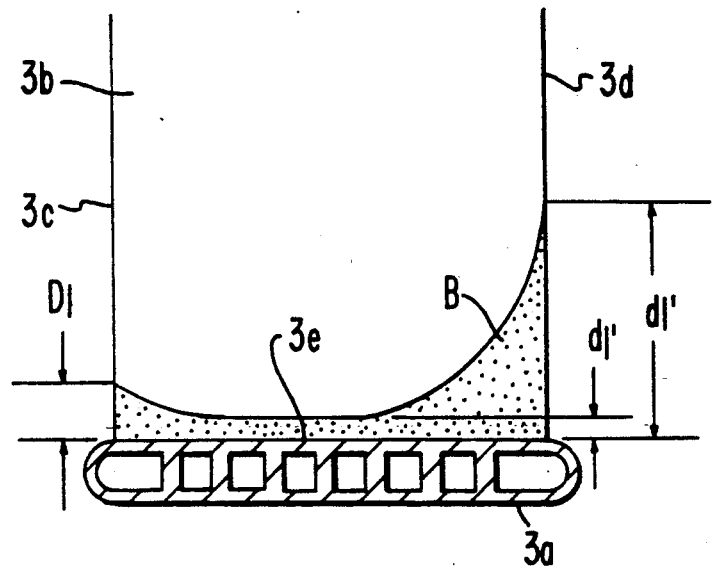
FIG. 5(a) is a cross-sectional view of a part of a heat exchanger illustrating the condition of flux that is attached in accordance with a conventional brazing method.
Figure 5B:
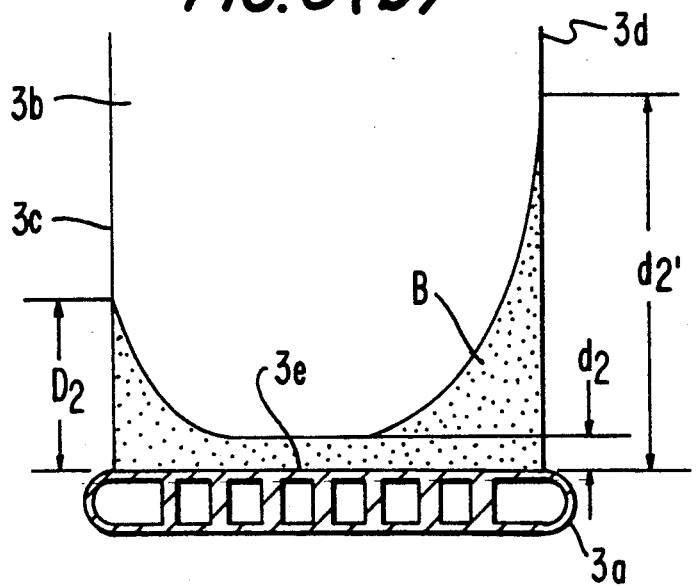
FIG. 5(b) is a cross-sectional view of a part of a heat exchanger illustrating the condition of flux that is attached in accordance with one embodiment of the present invention.

With reference to FIG. 5(a), the condition of attaching flux B to a heat exchanger using a conventional method is shown. The width of the layer of flux B attached to surface 3c of heat exchanger 3 is D1. The width of the layer of flux B attached to surface 3d of heat exchanger 3 is d'1. The width of the layer of flux B attached to the central surface of heat exchanger 3 is d'1. Flux B attached to a heat exchanger using one embodiment of the method of the present invention is illustrated in FIG. 5(b). The width of the layer of flux B attached to surface 3c of heat exchanger 3 is D2. The width of the layer of flux B attached to surface 3d of heat exchanger 3 is d'2. The width of the layer of flux B attached to central surface 3e of heat exchanger 3 is d2. The width D2 is greater than the width D1. Furthermore, since the water is sprayed in the same chamber as the flux is blown in, the air in flux chamber 1 will have a high humidity. Therefore, water will attach to surface 3d and central surface 3e as well as surface 3c. Thus, the widths d'2 and d2 are greater than the widths d'1 and d1, respectively.

Heat exchanger 3 is disposed on conveyor 9 so that surface 3d of heat exchanger 3 faces upward. Thus, as shown in FIG. 5(b), the amount of the flux attached to side surface 3d of heat exchanger 3 is greater than that of the flux attached to surface 3c side thereof. When heat exchanger 3 is dried in the preheat portion of furnace 8, the flux on the side surface of heat exchanger 3d is melted and flows downwardly under the force of gravity. Thus, the amount of the flux on the surface of heat exchanger 3 becomes uniform. Heat exchanger 3 then enters the brazing portion of furnace 8 where the assembly is completed.

The invention has been described in detail in connection with a preferred embodiment. The preferred embodiment is illustrative only and thus, the invention is not restricted thereto. It will be easily understood by those skilled in the art that other variations and modifications can be made within the scope of this invention.

We claim:

1. A method of brazing a temporarily assembled object having first and second opposite surfaces, the steps of the method comprising:
applying a layer of powdered electrostatically charged flux on both said first and second opposite surfaces of said object, said step of applying said powdered electrostatically charged flux including spraying an ionized fluid on only said first surface of said object, expelling said powdered electrostatically charged flux toward only said second surface of said object, said powdered electrostatically charged flux being attracted to said first surface by said ionized fluid on said first surface; and
brazing said object by using heat.

2. The method as recited in claim 1 further comprising the step of inserting said object within a chamber for said steps of spraying and expelling so that said chamber is saturated with said ionized fluid which can collect on said second surface of said object, thus ensuring uniform coverage of said object with said powered flux.

3. The method as recited in claim 1 wherein said step of expelling said powered electrostatically charged flux is achieved by blowing said flux using compressed air.

4. The method as recited in claim 2 wherein said step of expelling said powdered electrostatically charged flux is achieved by blowing said flux using compressed air.

5. The method as recited in claim 1 wherein said step of heating includes the step of drying said flux material.

6. The method as recited in claim 5 wherein said step of drying is accomplished by inserting said object within a furnace having a preheat portion, with said second surface of said object facing upwardly so upon heating said flux melts and flows toward said first surface to provide uniform coverage of said object.

7. The method as recited in claim 1 wherein said ionized fluid is water.

8. The method as recited in claim 1 further comprising the step of electrically charging said object with a polarity that is opposite to the polarity of said powdered electrostatically charged flux, prior to said step of expelling said flux.

9. A method a brazing a temporarily assembled heat exchanger having a plurality of parallel tube sections with a plurality of corrugated fins positioned between said tube sections, said method comprising:

applying a layer of powered electrostatically charged flux on first and second opposite side surfaces of said heat exchanger, said step of applying said powdered electrostatically charged flux including spraying an ionized fluid on only said first side surface, with the direction of spraying extending through the corrugated fins, expelling said powdered electrostatically charged flux toward only said second side surface, said powdered electrostatically charged flux being attracted to said first side surface by said ionized fluid on said first surface; and brazing said object by using heat.

10. The method as recited in claim 9 further comprising the step of temporarily assembling said heat exchanger utilizing a jig.

11. The method as recited in claim 9 further comprising the step of inserting said heat exchanger within a chamber for said steps of spraying and expelling, so that said chamber is saturated with said ionized fluid which can collect on said second side surface of said heat exchanger, such that said powdered flux is attracted to said second side surface of said heat exchanger by said ionized fluid.

12. The method as recited in claim 9 wherein said step of expelling said powdered electrostatically charged flux is achieved by blowing said flux by using compressed air.

13. The method as recited in claim 11 wherein said step of expelling said powdered electrostatically charged flux is achieved by blowing said flux by using compressed air.

14. The method as recited in claim 9 wherein said ionized fluid is water.

15. The method as recited in claim 9 wherein said step of heating includes the step of drying said flux.

16. The method as recited in claim 15 wherein said step of drying is accomplished by inserting said heat exchanger within a furnace having a preheat portion, with said second side surface as said heat exchanger facing upwardly so upon heating said flux melts and flows toward said first side surface to provide uniform coverage.

17. The method as recited in claim 9 further comprising the step of electrically charging said heat exchanger with a polarity that is opposite to the polarity of said powdered electrostatically charged flux, prior to said step of expelling said flux.

18. A method of brazing a temporarily assembled object having and second opposite surfaces, said method comprising:

spraying an ionized fluid on said first surface of said object;

expelling a powdered electrostatically charged flux toward said second surface of said object, said powdered electrostatically charged flux being attracted to said first surface by said ionized fluid;

inserting said object into a furnace having a preheat portion to dry said flux, said object being positioned with said second surface facing upwardly so that upon heating said flux melts and flows toward said first surface to provide uniform coverage of said object; and heating said object to effect brazing.

19. A method of brazing a temporarily assembled heat exchanger having a plurality of corrugated fins positioned between said tube sections, the method comprising;

spraying an ionized fluid on a first side surface of said heat exchanger, with the direction of spraying extending through the corrugated fins;

expelling a powdered electrostatically charged flux toward a second side surface, opposite from said first side surface, said powdered electrostatically charged flux being attracted to said first side surface by said ionized fluid;

inserting said heat exchanger into a furnace having a preheat portion to dry said flux, said heat exchanger being positioned with said second side surface facing upwardly so that upon heating said flux melts and flows toward said first side surface to provide uniform coverage of said heat exchanger; and heating said heat exchanger to effect brazing.

* * * * *